United States Patent
James (10) Patent No.: US 11,765,212 B2
(45) Date of Patent: Sep. 19, 2023

(54) COMMUNICATION APPARATUS AND METHOD FOR SENDING A COURTESY MESSAGE

(71) Applicant: Patmos Unipessoal LDA, Madeira (PT)

(72) Inventor: Robert James, Hertfordshire (GB)

(73) Assignee: PATMOS, UNIPESSOAL LDA, Madeira (PT)

(*) Notice: Subject to any disclaimer, the term of this patent is extended or adjusted under 35 U.S.C. 154(b) by 0 days.

(21) Appl. No.: 17/271,168

(22) PCT Filed: Aug. 28, 2018

(86) PCT No.: PCT/IB2018/056548
§ 371 (c)(1),
(2) Date: Feb. 24, 2021

(87) PCT Pub. No.: WO2020/044076
PCT Pub. Date: Mar. 5, 2020

(65) Prior Publication Data
US 2021/0250389 A1    Aug. 12, 2021

(51) Int. Cl.
*H04L 65/40* (2022.01)
*H04M 1/724* (2021.01)
(Continued)

(52) U.S. Cl.
CPC ............ *H04L 65/40* (2013.01); *H04L 51/18* (2013.01); *H04L 67/141* (2013.01); *H04L 67/143* (2013.01); *H04M 1/724* (2021.01)

(58) Field of Classification Search
CPC ......... H04L 51/02; H04L 51/18; H04L 65/40; H04L 67/141; H04L 67/143; H04M 1/724;
(Continued)

(56) References Cited

U.S. PATENT DOCUMENTS 5,828,731 A * 10/1998 Szlam ................ H04M 3/5158
                                                        379/88.16
6,662,026 B1 * 12/2003 Cordray .............. H04M 1/724
                                                          455/406
(Continued)

FOREIGN PATENT DOCUMENTS

CN    106453931 A  *  2/2017  ........ H04M 1/72403
FR      2525833 A1 * 10/1983  .......... H04M 11/066
JP    H03-49451 A      3/1991

OTHER PUBLICATIONS

"Cisco SS7 Fundamentals". Cisco Systems. Chapter 5, ISUP and TCAP, Posted Sep. 28, 2022,<https://docstore.mik.ua/univercd/cc/td/doc/product/tel_pswt/vco_prod/ss7_fund/>, Accessed Jan. 26, 2023 (Year: 2002).*

(Continued)

*Primary Examiner* — Vivek Srivastava
*Assistant Examiner* — William C McBeth
(74) *Attorney, Agent, or Firm* — Workman Nydegger (57) ABSTRACT

A communication apparatus and a method for sending a courtesy message to a recipient to whom a communication request has been sent by mistake are provided. The communication apparatus includes a processor configured for detecting a first interaction of the user with an interface adapted to start a first communication session towards the recipient, detecting a second interaction of the user with the interface for requesting the interruption of the first communication session, interrupting the first communication session, and determining, on the basis of the time of occurrence of the first interaction and the second interaction, whether a courtesy message should be transmitted to the recipient, and, should the transmission of the courtesy message be necessary, transmitting the courtesy message to the recipient in the course of a second communication session.

11 Claims, 3 Drawing Sheets

(51) Int. Cl.
*H04L 51/18* (2022.01)
*H04L 67/141* (2022.01)
*H04L 67/143* (2022.01)

(58) Field of Classification Search
CPC ............... H04M 3/42; H04M 3/42042; H04M 1/72436; H04W 4/16
See application file for complete search history.

(56) References Cited

U.S. PATENT DOCUMENTS

| | | | |
|---|---|---|---|
| 6,804,508 | B1 | 10/2004 | Yamada |
| 2009/0023427 | A1* | 1/2009 | Kahn ................ H04M 3/42195 455/414.1 |
| 2012/0171983 | A1* | 7/2012 | Eitel ..................... H04M 11/04 455/404.1 |
| 2013/0210402 | A1* | 8/2013 | Guo ........................ H04M 1/60 455/418 |
| 2013/0337790 | A1* | 12/2013 | Oh ......................... H04M 1/724 455/414.1 |
| 2015/0201313 | A1* | 7/2015 | Celik .................... H04M 1/724 455/414.1 |
| 2015/0215454 | A1* | 7/2015 | Matsuo .................. H04W 4/16 455/414.1 |
| 2017/0279963 | A1* | 9/2017 | Mittal ............... H04M 1/72469 |

OTHER PUBLICATIONS

"Cisco SIP IP Phone Administrator Guide Release 7.5". Cisco Systems. Appendix B, SIP Call Flows, Jul. 2005 (Year: 2005).*
International Search Report dated Apr. 24, 2019, issued in PCT Application No. PCT/IB2018/056548, filed Aug. 28, 2018.
Written Opinion dated Apr. 24, 2019, issued in PCT Application No. PCT/IB2018/056548, filed Aug. 28, 2018.

* cited by examiner

COMMUNICATION APPARATUS AND METHOD FOR SENDING A COURTESY MESSAGE

BACKGROUND OF THE INVENTION

1. The Field of the Invention

The present invention relates to a communication apparatus and to a method for sending a courtesy message, in particular for sending said courtesy message to a recipient of a communication request activated by mistake.

2. The Relevant Technology

It may happen, in fact, that a user of a telephone service, e.g., a service provided by a telephone company or an Internet-based Voice over IP (VoIP) service, presses by mistake a key of his/her phone or accidentally touches an icon on the touchscreen, thereby unintentionally causing the start of a phone call, or that he/she calls up a relative or a friend and, soon after having started the call, realizes that a call would be inappropriate at that very moment (e.g., in the middle of the night), or that he/she selects the wrong recipient. In order to avoid undue disturbance, and maybe also apprehension, even without talking to the recipient, it would be appropriate to send a message, hereafter referred to as "courtesy message", informing the recipient about the mistake and reassuring him/her that he/she needs not answer or call back.

Writing and sending such a message manually may be annoying and takes some time, with the risk that it might be anticipated by the called party's answer or callback.

Moreover, in some telecommunications systems known in the art, in particular in some telephone systems, the communications network over which the calls are transmitted executes a number of checks before sending the call notification to the called party, including verifications of the calling party's credentials, of the availability of phone credit, of the called party's availability, etc. These operations may require a few seconds. If during this lapse of time the calling party cancels the communication request, the recipient may receive a notification message concerning the unanswered call that he/she has no knowledge of, thus suffering from perplexity and disturbance. In addition, especially in case of telephone communications occurring through an Internet-based application, the communication is established in an extremely short time (typically less than one second), so that it is very difficult for the user to stop the call before the called party's receives a notification. Furthermore, such applications provide in any case for sending a notification message to the called party in order to inform him/her that a call attempt was made, even if the call was not successful, e.g., because the called party was not connected to the Internet. These generically sent notification messages may cause anxiety in the called party and may induce the latter to call back the calling party.

American patent publication U.S. Pat. No. 6,804,508 B1 to NEC CORPORATION describes a telephone terminal configured for automatically transmitting a courtesy message to the called phone after a call has been started because of a mistake made by the user of said telephone terminal. According to said patent (as can be understood at the end of the description), the courtesy call is sent to the called party before the telephone line is disconnected. This solution turns out to be extremely annoying, in that it requires that an active communication be always established with the party called by mistake, thus disturbing him/her. For example, if the call (started by mistake) is made from a location in a time zone other than that of the called party, the called person might be awakened from sleep.

SUMMARY OF THE INVENTION

The present invention aims at solving these and others problems by providing an improved communication apparatus.

Furthermore, the present invention aims at solving these and other problems by providing an improved method for sending a courtesy message.

The basic idea of the present invention is to readily interrupt a communication session activated by mistake, and in such a case to send a courtesy message to the called party in the course of a new communication session, distinct from the previous one.

It must be pointed out that, in this description, the term "communication session" refers to everything occurring downstream of the communication request made by the calling party, i.e., everything occurring after a call recipient has been selected and the call start key has been pressed (dialing).

In this manner, it is possible to reduce the probability of establishing an unnecessary direct communication with the called party.

Furthermore, it is also possible to reduce the level of disturbance suffered by the called party (e.g., by sending the courtesy message as an SMS text message or an instant message transmitted through an Internet-based messaging service), so as to minimize the duration of the phone call notification, without compelling the called party to pick up the call.

Further advantageous features of the present invention are set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting example, wherein.

DETAILED DESCRIPTION OF THE PREFERRED EMBODIMENTS

Any reference to "an embodiment" in this description will indicate that a particular configuration, structure or feature is comprised in at least one embodiment of the invention. Therefore, the phrase "in an embodiment" and other similar phrases, which may be present in different parts of this description, will not necessarily be all related to the same embodiment. Furthermore, any particular configuration, structure or feature may be combined in one or more embodiments as deemed appropriate. The references below are therefore used only for simplicity's sake and do not limit the protection scope or extent of the various embodiments.

Figure 1:
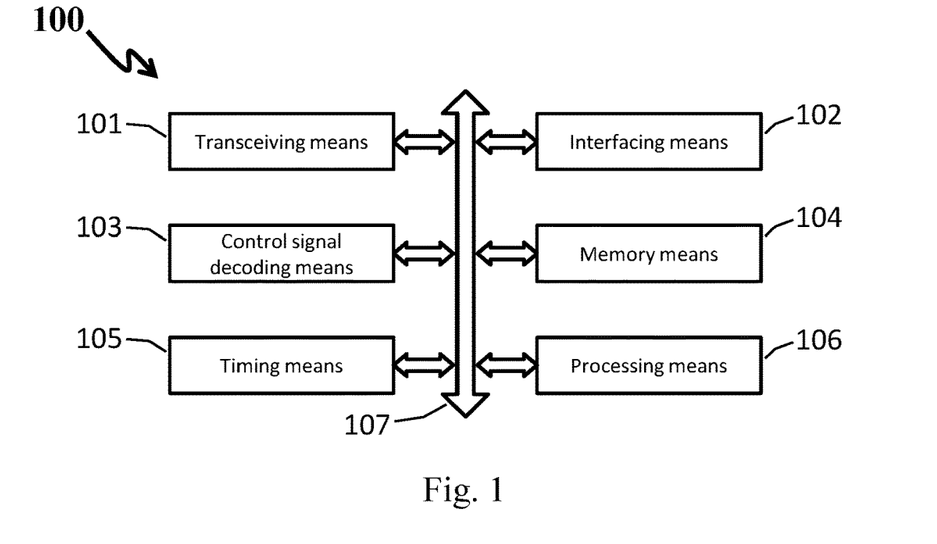
FIG. 1 is a block diagram that shows the most important elements of an apparatus according to an embodiment of the present invention.

As shown in FIG. 1, the communication apparatus 100 according to the invention comprises at least the following parts:
- transceiving means 101 adapted to transmit and receive, through a communications network (preferably a GSM, GPRS, EDGE, UMTS, LTE, 5G, WiFi network, or the like), information signals comprising respective control signals;
- interfacing means 102 (e.g., a touchscreen, an alphanumeric keyboard, a microphone, or the like) allowing interactions with a user of said communication apparatus 100;
- memory means 104 (e.g., a RAM, ROM, Flash memory, or the like) capable of storing data and/or a set of instructions implementing the phases of a method for sending a courtesy message according to the invention;
- processing means 106 (e.g., a CPU, a CPLD, an FPGA, a microcontroller, or the like) for processing data and executing commands and instruction programs;
- a communication bus 107 for exchanging data and information between at least two of the above-mentioned elements.

The communication apparatus 100 may also comprise other elements, including timing means 105 for counting the time of the operations and for implementing at least one timer and/or means for decoding control signals 103 coming from the communications network along with the information signals, and other means that will be described in detail below.

The operations of the communication apparatus 100 are preferably controlled and executed by the processing means 106. To this end, the processing means 106 are configured for carrying out the following activities:
- detecting a first interaction of the user with the interfacing means 102 for starting, through the transceiving means 101, a first communication session towards a recipient (e.g., the processing means 106 can detect when the user starts a call by using a touchscreen, a voice recognition system, or the like);
- detecting a second interaction of the user with the interfacing means 102 for requesting the cancellation or interruption of said first communication session (e.g., when the user presses the hang-up key);
- interrupting said first communication session, i.e., closing the communication session with the communication network;
- evaluating, on the basis of the time of occurrence of said first interaction and said second interaction, whether to transmit a courtesy message to said recipient (e.g., a voice message or, preferably, a text message, such as an SMS message, an instant message transmitted through an Internet-based messaging service, an e-mail, or another type of message) and, should the transmission of said courtesy message be necessary, transmitting said courtesy message to said recipient in the course of a second communication session.

It must be pointed out that the processing means 106 decide whether to transmit the courtesy message to the recipient or not on the basis of the time of occurrence of said first interaction and said second interaction. This means that the occurrence of these two interactions is a necessary (though not always sufficient) condition for the courtesy message to be sent. Hereafter several technical characteristics will be described which will allow making a decision as to whether or not to transmit the courtesy message upon the occurrence of these two interactions through the interface means 102.

In summary, the method according to the invention comprises the following phases:
- a communication start phase, wherein the processing means 106 detect a first interaction of a user with the interfacing means 102 for starting, through the transceiving means 101, a first communication session towards a recipient;
- a block request phase, wherein the processing means 106 detect a second interaction of the user with the interfacing means 102 for requesting the cancellation or interruption of said first communication session;
- an interruption phase, wherein the processing means 106 interrupt said first communication session;
- a courtesy phase, wherein the processing means 106 establish whether it is necessary to transmit a courtesy message to said recipient at least on the basis of the time of occurrence of said first interaction and said second interaction, and, should the transmission of said courtesy message be necessary, said courtesy message is transmitted to said recipient in the course of a second communication session.

Thus, the recipient called by mistake will be notified in a more discrete manner. In fact, by starting the second communication session it will be possible to transmit the courtesy message in a mode (e.g., SMS (Short Message Service), electronic mail, Internet-based instant messaging service, or the like) that will be perceived by the recipient as having a lower level of urgency than a phone call. This will reduce the probability of establishing an unnecessary direct communication with the called party (e.g., a phone call through a telephone network or VoIP).

In operating conditions, the processing means 106 may also carry out the following steps:
- starting, in the timing means 105, a timer set to a predetermined time Ta starting from the instant when the user of the communication apparatus 100 starts a communication request through the interfacing means 102;
- examining the state of the timer Ta at the instant when the communication is interrupted following a command issued by the user of the communication apparatus 100;
- generating a "courtesy message" and sending it to the called party, in the course of a second communication session, through the transceiving means 101, if said time Ta has not expired.

In other words, as aforementioned, the apparatus 100 may also comprise timing means 105 adapted to count the passing of time (e.g., a time-stable square-wave generator, also known as "clock"); in addition, the processing means 106 may be configured for carrying out the following activities:
- detecting (in the course of the communication start phase), through said timing means 105, a first time datum that defines a time instant when the user has the first interaction (e.g. starts a call) with the interfacing means 102;
- detecting (in the course of the block request phase), through said timing means 105, a second time datum that defines a time instant when the user has the second interaction (e.g., the call cancellation or interruption request) with the interfacing means 102;
- calculating (in the course of the cancellation or interruption phase), on the basis of said first time datum and said second time datum, a duration datum representing the duration of said first communication session.

Following such activities, the processing means 106 may be configured for establishing (in the course of the courtesy phase) whether to transmit the courtesy message also on the basis of said duration datum. For example, the processing means 106 may be configured for transmitting (in the course of the courtesy phase) the courtesy message to the recipient if the value of said duration datum is below a first threshold, i.e., lower than Ta.

This will reduce the probability of causing much disturbance to the called party, while reducing the probability of establishing an unnecessary direct communication with the called party (e.g., a call through a telephone network or VoIP).

In fact, the courtesy message will only be sent if the communication is interrupted within the time Ta. The latter should be short enough to avoid confusing a cancelled communication started by mistake with a regularly closed communication. On the other hand, Ta should be long enough to allow the user to become aware of the mistake and to allow him/her sufficient time to cancel the call.

In the particular embodiment that will now be considered, wherein it is assumed that the telecommunications system will immediately start the activation of the connection between the calling party and the called party, without allowing the calling party sufficient time to cancel or interrupt the call, Ta may be defined by taking into account the time Td that the called party will presumably wait before picking up the call. In general, and particularly in embodiments that will be described hereinafter, the value of Ta may be defined by also taking into account the time Tc taken by the telecommunications system for, before sending the call notification to the recipient, executing the above-mentioned checks, i.e., Ta may be sized as the sum of Tc and Td.

With such a setting, the cancelling command can advantageously be issued by pressing the same key, or by touching the same icon, as the one that the user of the apparatus would use to normally close a communication in progress.

It must be pointed out that in some telecommunications services, e.g., call services based on Internet applications (i.e., the so-called VoIP services), a message (e.g., a notification message) is sent to the called party in order to inform him/her that the calling party made an attempt to call him/her, even if the call was not successful. In these cases, it would be advisable to send a courtesy message anyway, by appropriately setting the timer Ta.

To do this, the communication apparatus 100 must be provided with a suitable command for cancelling or interrupting the communication request, upon the activation of which the communication apparatus 100 will automatically transmit a courtesy message, as will be further described below.

Figure 2:
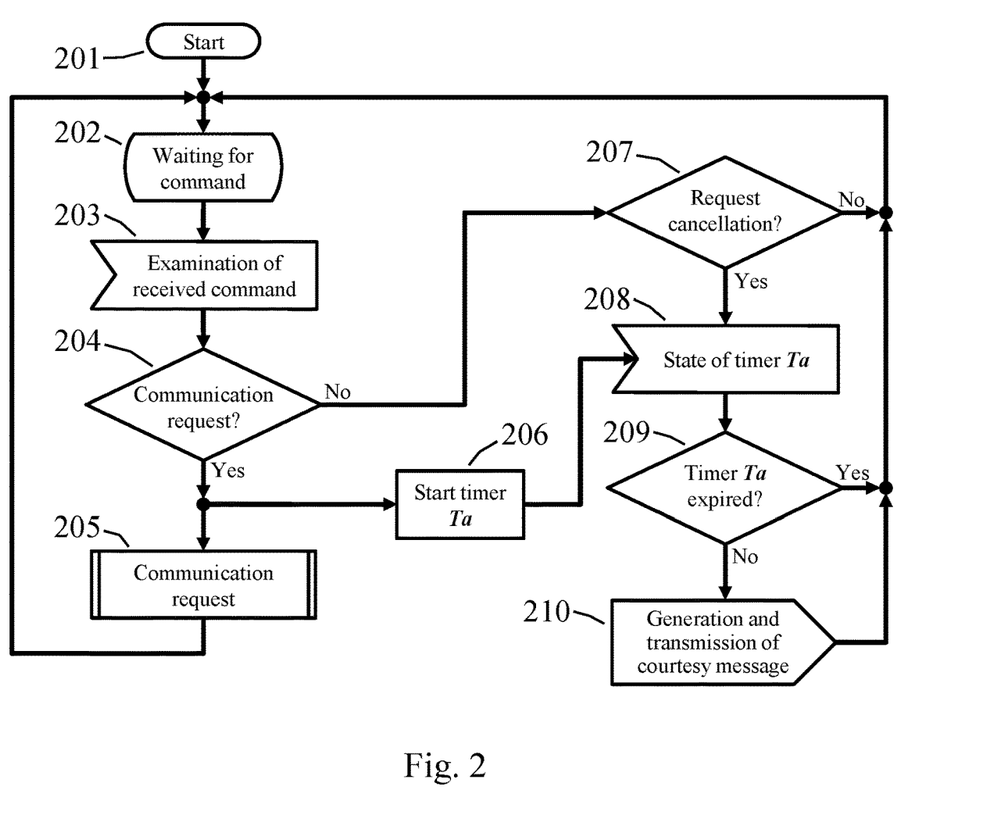
FIG. 2 is a flow chart that shows a first example of the flow of operations carried out during the execution of the method according to the invention.

More in detail, an embodiment of the invention comprises a flow of operations that will now be described with reference to FIG. 2.

After the start (phase 201), a state of waiting for a command from the user of the communication apparatus 100 is entered (phase 202).

When a command is received, it is examined (phase 203) to discriminate whether it is a communication request or the cancellation of a communication request, or a command of a different kind. In the following discrimination phase (phase 204), if the received command is a communication request, the associated request procedure will be started (phase 205), simultaneously with a timer set to a time Ta (phase 206). After the activation of the communication request procedure (phase 205), the apparatus will wait again for a new command from the user (phase 202).

Conversely, if in the discrimination phase 204 it is ascertained that the received command is not a communication request, the procedure will go to the discrimination phase 207, wherein it is established whether the received command is a cancellation of a communication request or a command of a different kind. In this latter case, the procedure will go back to the command waiting phase 202, whereas if a communication request cancellation command has been received, the state of the timer Ta (phase 208) will be acquired and the procedure will then go on to the discrimination phase 209, wherein it will discriminate whether the timer Ta has expired or not.

If Ta has expired, the procedure will return to the command waiting phase 202, whereas if it has not expired, the courtesy message will be generated and sent (phase 210), after which the procedure will return to the command waiting phase 202.

As already mentioned above, the communication request may be a traditional phone call, or a phone call made through a VoIP (Voice over IP) application or another form of communication that may be subject to accidental or mistaken activation, such as unintentional pressing of a key, unintentional touching of an icon, wrong recipient selection, or human error. If the user of the apparatus promptly realizes, within a time Ta, that such an activation has occurred, he/she may execute an action for cancelling or interrupting the communication request, while at same time sending a courtesy message.

The courtesy message is preferably addressed to the same recipient of the communication request. For example, if the communication request is a phone call made through a VoIP application and addressed to a friend's mobile phone number, then the courtesy message will preferably be addressed to the same phone number or address of the party called through the application, and will preferably be sent through the same application as the one used for the VoIP call. As an alternative, the courtesy message may be sent to the same mobile phone number through a normal SMS message. The courtesy message may optionally be sent to a different address (e.g., an electronic mail address), to a second mobile phone number where the called party could answer, or simultaneously to several addresses and/or in different manners.

The contents of the courtesy message preferably comprise the apologies for the inconvenience caused by the unintentional call and the caller's reference data, but may also comprise other information, such as, for example, the caller's location, information about the possibility of answering phone calls, the time when the calling party is available, and more. These contents may be stored, at least partly, into the memory means 104, in which case the processing means 106 will generate the courtesy message on the basis of the data contained in the memory means 104, possibly with the addition of data about the circumstance (place, time, caller's availability, and more).

In other words, the memory means 104 may contain at least one composition datum that defines how at least one portion of said courtesy message should be generated, and said processing means 106 may be configured for generating said courtesy message (in the course of the courtesy phase) on the basis of said at least one composition datum.

This will allow the generation of predefined courtesy messages which can be easily recognized by the called party and which cause little apprehension, thus making it possible to reduce the probability of establishing an unnecessary direct communication with the called party (such as, for example, a call through the telephone network or VoIP).

Moreover, the contents of the message may be customized according to the recipient, i.e., put in relation with the calling party's address book. In fact, a more or less familiar form of the message, the availability of one or more additional addresses, the amount and type of additional information to be included in the message, and the like, may depend on the called party's identity.

In other words, said at least one composition datum (contained in the memory means 104) may define said at least one portion of said courtesy message as a function of a recipient, wherein said processing means 106 may be configured for generating said courtesy message (in the course of the courtesy phase) also on the basis of the recipient to which the first communication session was addressed.

This permits the generation of courtesy messages which will be even more easily recognizable by the called party, and which will cause even less apprehension, thus further reducing the probability of establishing an unnecessary direct communication between the called party and the calling party.

In many cases, the communication request can be stopped by using the means already available for normally closing a communication under way. In other cases it may be appropriate or necessary to provide said communication apparatus 100 with a specific command for cancelling or interrupting the communication request.

In particular, the interfacing means 102 may be configured for communicating to the user (during a waiting phase, which may be comprised in the method according to the invention) that, if the second interaction occurs for cancelling or interrupting said first communication session, said processing means 106 will transmit said courtesy message. For example, the hang-up key displayed on the touchscreen of the apparatus 100 may appear in a different colour, or its colour may change intermittently, if, when touched, there are the conditions for sending said courtesy message.

This will allow the user of the apparatus 100 to close the communication session as soon as possible, thus avoiding (whenever possible) the transmission of the courtesy message. This will further reduce (or even eliminate) the probability of establishing an unnecessary direct communication with the called party.

As previously described, in some telecommunications systems a few seconds may elapse between the instant when a communication request is originated and the instant when the communications network sends the call notification to the called party and informs the calling party that said call notification has been sent. In this context, sending a courtesy message before the call has been successfully established (with the called party receiving the associated notification) would cause the called party's terminal to receive a courtesy message concerning a call that was not received and the called party has no knowledge of. In order to avoid this annoying inconvenience, and to further reduce the probability of establishing an unnecessary direct communication with the called party, in one embodiment of the invention the communication apparatus 100 may also comprise decoding means 103 adapted to decode control signals received from said communications network through said transceiving means 101 (e.g., means allowing the calling party to send to the called party a free/busy/out-of-range indication about the called party, which the latter will be able to extract from the signals received from the telecommunications system, or an integrated circuit executing a set of instructions allowing it to read the data received/transmitted by the transceiving means 101 from/to said communications network, or software executed by the processing means 106, which implements the functionality of a so-called "sniffer", or the like), and wherein said processing means 106 may also be configured for performing the following actions:

establishing (in the course of the interruption phase), on the basis of the signals decoded by said decoding means, if, after the start of said first communication session, a control signal has been received from said communications network, wherein said control signal indicates that the recipient has received a notification of said first communication session;

inhibiting (in the course of the courtesy phase) the transmission of said courtesy message, if said control signal has not been received.

If the apparatus 100 operates on a GSM/UMTS/LTE network, the decoding means 103 may be configured for decoding an alerting message (relating to the call setup signalling), indicating if the called party's phone is ringing, i.e., if the called party is being notified about the incoming call.

This will advantageously avoid that, if the alerting signal has not been received by the calling party, the transmission of courtesy messages might disturb or worry the called party.

Figure 3:
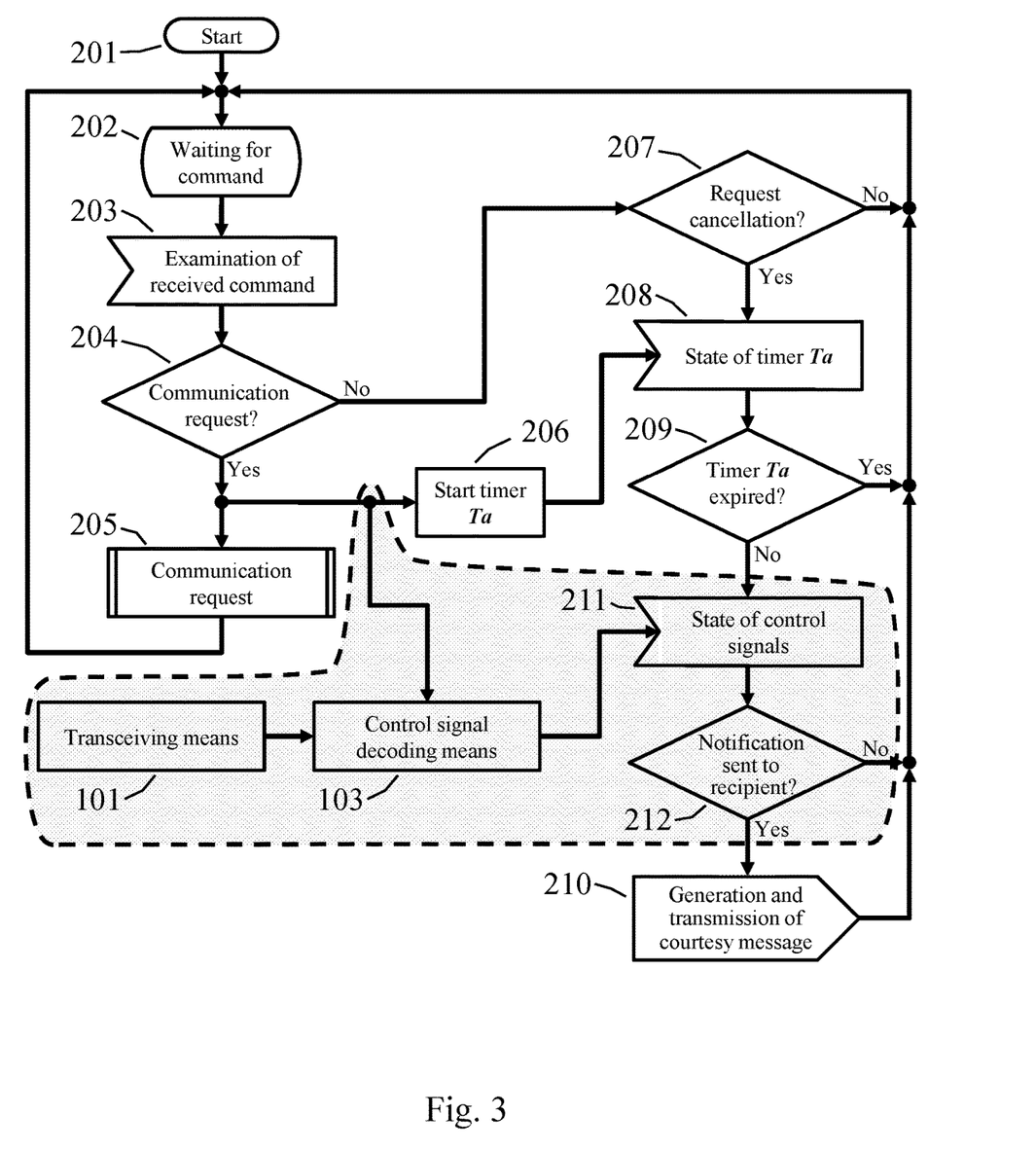
FIG. 3 is a second flow chart that shows a second example of the flow of operations carried out during the execution of the method according to the invention.

Also with reference to FIG. 3, the following will illustrate the flow of operations carried out in this embodiment. It is identical to the flow of operations illustrated in FIG. 2, except for the addition of the phases and elements relating to the above-described operations. In FIG. 3 such elements are grouped within an area with a dashed outline. The phases added to the flow of operations are those inserted between the phases 209 and 210, numbered as 211 and 212.

The phase 211 represents the examination, by the processing means 106, of the control signals received by the transceiving means 101 and decoded by the decoding means 103, starting from the instant when the communication request is sent.

In this discrimination phase 212, it is established to return to the command waiting phase 202 if no control signal has been received indicating that a communication request notification has been sent to the recipient, thus avoiding the transmission of the courtesy message; if, on the contrary, such a control signal has been received, the courtesy message will be generated and sent (phase 210), after which the procedure will return to the command waiting phase 202.

In another embodiment of the invention, in order to avoid the transmission of the courtesy message when the communication request notification has not been sent to the recipient, the processing means 106 may also be configured for carrying out the following activities:

starting, in the timing means 105, also a timer set to a time Tb (shorter than Ta), starting from the instant when the user of the communication apparatus 100 starts a communication request through the interfacing means 102;

verifying the state of the timer Tb at the instant when the user of the communication apparatus 100 cancels or interrupts the communication request;

inhibiting the transmission of the courtesy message if said time Tb has not elapsed.

In other words, the processing means 106 may also be configured for inhibiting (in the course of the courtesy phase) the transmission of said courtesy message to said recipient in the event that (the value of) said duration datum is below a second threshold.

In this manner, if the user of the communication apparatus 100 cancels the communication request before Tb has elapsed, then the courtesy message will not be sent. Assuming that a good estimate is available for the time elapsing between the transmission of the communication request and the transmission of the notification for that request to the recipient, by setting Tb to such a value it will be possible to avoid transmitting the courtesy message to the recipient, who will have no knowledge of the communication request, thus reducing the probability of establishing an unnecessary (and maybe also annoying) direct communication with the called party.

In these cases, as already described above, the interfacing means 102 may be configured for communicating to the user that, if the second interaction occurs for cancelling or interrupting said first communication session, said processing means 106 will transmit said courtesy message. For example, the hang-up key displayed on the touchscreen of the apparatus 100 may appear in a different colour, or its colour may change intermittently as each one of the timers Tb and Ta expires, so that the calling party will know whether or not there are the conditions for sending said courtesy message.

This will allow the user of the apparatus 100 to close the communication session as soon as possible, thus avoiding (whenever possible) the transmission of the courtesy message. This will further reduce (or even eliminate) the probability of establishing an unnecessary communication with the called party.

It must however be pointed out that in some telecommunications services, such as, for example, Internet-based call services, the called party is sent a message informing him/her that a call attempt was made by the calling party, even if the call was unsuccessful. In these cases it will be appropriate to send a courtesy message even if the communication has been interrupted before the called party has received the call notification. In these cases, it is possible to resort to the apparatus' control signals containing the information about the type of application used and allowing suitable settings for the timers Ta and Tb, so that, in any case, the called party will be informed about the unsuccessful call attempt through the courtesy message.

The courtesy message may be a high-priority message and/or a flash message, so that the recipient can immediately see it. Flash messages are particularly suitable for this, because they are displayed on the recipient's device without the recipient having to open them. This will further reduce the probability of establishing an unnecessary direct communication with the called party (e.g., a phone call through a telephone network or VoIP).

Each one of the above-described embodiments is particularly suitable for operating in connection with different telecommunications systems, i.e., telecommunications systems that start immediately the connection between the calling party and the called party, without allowing the calling party the time necessary for cancelling or interrupting the call, or telecommunications systems providing feedback about the called party's state, so that it can be established whether or not to send the courtesy message also on the basis of such feedback, or telecommunications systems providing no feedback, but taking some time, known with good approximation, to carry out their own checks before forwarding the call notification to the recipient. The communication apparatus 100 can, in many cases, identify the type of telecommunications system it has to operate with by considering the type of application used for making the call, the recipient's address, and possibly other information stored in the address book.

According to the present invention, it is possible to implement an apparatus that, from time to time, can automatically choose the most appropriate mode for deciding whether to send a courtesy message or not.

Figure 4:
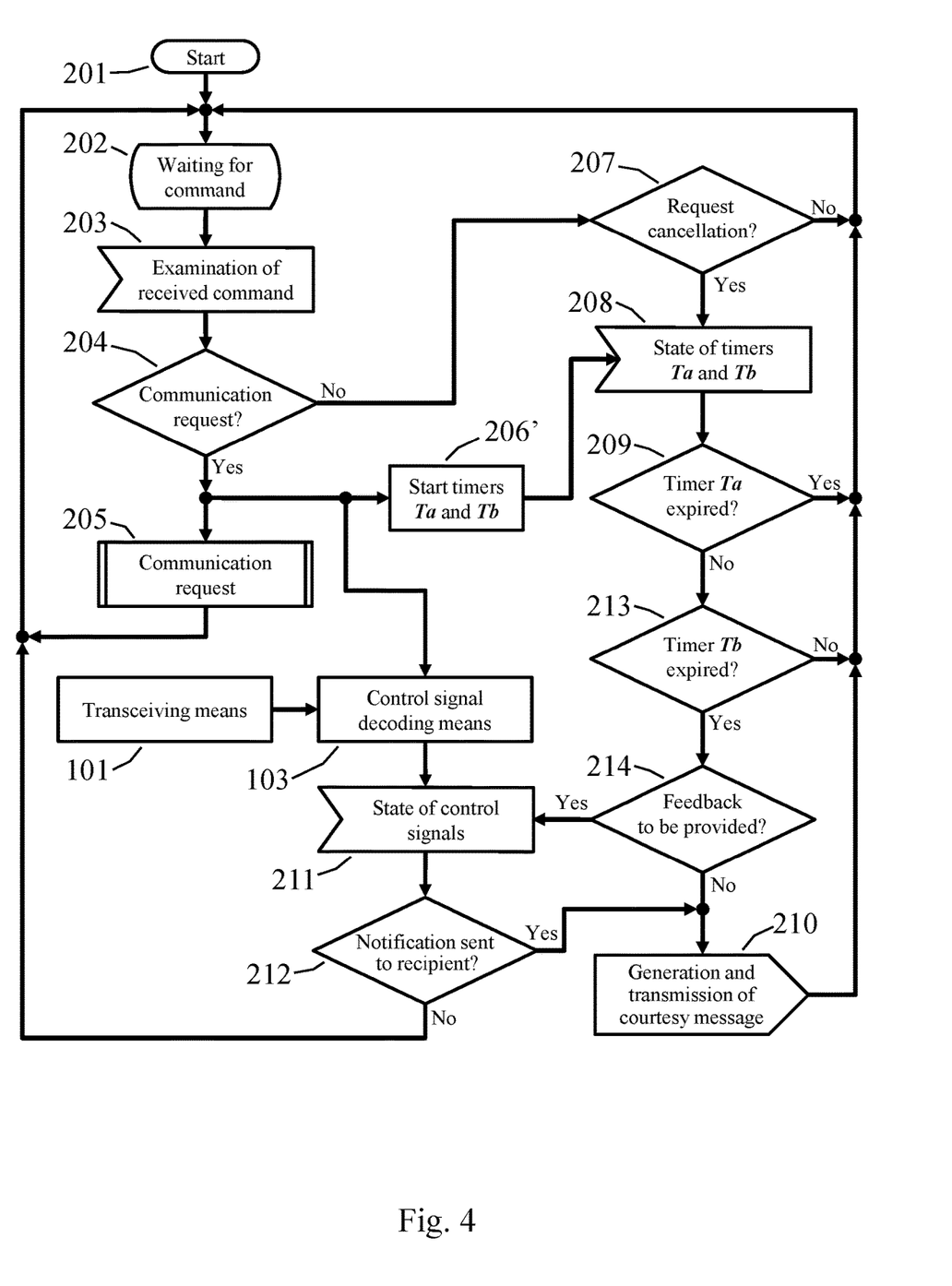
FIG. 4 is a third flow chart that shows a third example of the flow of operations carried out during the execution of the method according to the invention.

Also with reference to FIG. 4, the following will illustrate an example of such implementation, wherein the above-mentioned three different telecommunications systems are taken into consideration (i.e., system without the possibility of cancelling the call, system providing no feedback, system providing no feedback but having known delays). The flow of operations of FIG. 4 is similar to that of FIG. 3, with the following differences:

- in phase 206, renamed as 206', both the timer Ta (time limit after which the courtesy message will no longer be sent) and the timer Tb (time limit before which the transmission of the courtesy message will be inhibited) are started;
- discrimination phase 213 (added downstream of phase 209), wherein it is discriminated whether the timer Tb has expired or not; if Tb has not expired, i.e., the telecommunications system has not yet sent the call notification to the recipient, the procedure will return to the waiting phase 202, otherwise it will go on to phase 214;
- discrimination phase 214, wherein it is discriminated whether the telecommunications system is to provide feedback about the transmission of the call notification to the recipient or not; if no feedback is to be provided, the procedure will go on to the phase 210 of generating and sending the courtesy message, otherwise it will go to the discrimination phase 212 and will continue as in the flow of operations of FIG. 3.

As aforesaid, the communication apparatus 100 may automatically establish the values of Ta and Tb on the basis of the application used for requesting the connection (and of the information contained in the address book) and, still on the basis of the same information, may obtain the information about the possibility of getting feedback from the telecommunications system.

This embodiment offers the additional advantage of automatically adapting the criteria for sending the courtesy message to different types of telephone and messaging systems and to various characteristics of the telecommunications system. In other words, the processing means 106 may also be configured for executing (in the course of the communication start phase) the following steps:

- reading a service type datum that defines the type of a telecommunications service (e.g., a mobile telephone service, a telephone service over a packet-switching network (VoIP), or the like) to which the transceiving means 101 gain access through the telecommunications network following the user's first interaction;
- determining the values of the timers Ta and/or Tb (i.e., the value of the first and/or second thresholds) on the basis of said service type datum. For example, in call services based on Internet applications, whenever the service envisages to send a message to the called party in order to inform him/her that the calling party made an attempt to call, even when the call in unsuccessful, the timer Tb may be set to zero and the timer Ta may be set to a high value.

In this way it is possible to adapt the transmission of courtesy messages to various types of services accessible through the telecommunications network, thereby reducing the probability of establishing an unnecessary direct communication with the called party.

Although this description has tackled some of the possible variants of the present invention, it will be apparent to those skilled in the art that other embodiments may also be implemented, wherein some elements may be replaced with other technically equivalent elements. The present invention is not therefore limited to the illustrative examples described herein, since it may be subject to many modifications, improvements or replacements of equivalent parts and elements without departing from the basic inventive idea, as set out in the following claims.

The invention claimed is:

1. A communication apparatus, comprising:
    a transceiver for communicating with a telecommunications network,
    a user interface for allowing interactions with a user of said communication apparatus,
    a decoder adapted to decode control signals received from said telecommunications network through said transceiver, and
    a processor configured for:
        detecting a first interaction of the user with the user interface for starting, through the transceiver, a first communication session towards a recipient,
        detecting a second interaction of the user with the user interface for requesting an interruption of said first communication session,
        interrupting said first communication session,
        determining, on the basis of one or more control signals decoded by said decoder, if, after the start of said first communication session, a select control signal has been received from said telecommunications network which indicates that the recipient has received a reception notification of said first communication session,
        determining, on the basis of a time of occurrence of said first interaction and said second interaction, whether a first time threshold has been exceeded,
        in response to determining that said select control signal has not been received by said transceiver or that said first time threshold has been exceeded, inhibiting transmission of a courtesy message to said recipient,
        in response to determining that said select control signal has been received by said transceiver and that said first time threshold has not been exceeded, transmitting said courtesy message to said recipient in the course of a second communication session.

2. The communication apparatus according to claim 1, wherein the user interface is configured for communicating to the user that, if said second interaction for requesting the interruption of said first communication session occurs, said processor will transmit said courtesy message.

3. The communication apparatus according to claim 1, comprising:
    a timer adapted to count passing of time,
    wherein the processor is also configured for:
        detecting, through said timer, a first time datum that defines a time instant when the user has the first interaction with the user interface,
        detecting, through said timer, a second time datum that defines a time instant when the user has the second interaction with the user interface,
        calculating, on the basis of said first time datum and said second time datum, a duration datum representing a duration of said first communication session,
        and wherein said processor is configured for establishing whether said first time threshold has been exceeded on the basis of said duration datum.

4. The communication apparatus according to claim 3, wherein said processor is also configured for inhibiting the transmission of said courtesy message to said recipient, if said duration datum is below a second time threshold, which is lower than said first time threshold.

5. The communication apparatus according to claim 1, wherein said processor is also configured for:
    reading a service type datum that defines a type of a telecommunications service to which the transceiver gains access through the telecommunications network following the first interaction of the user, and
    determining a value of the first time threshold on the basis of said service type datum.

6. A method for sending a courtesy message, comprising:
    detecting, by a processor, a first interaction of a user with a user interface for starting a first communication session towards a recipient through a transceiver adapted to communicate with a telecommunications network;
    detecting, by said processor, a second interaction of the user with the user interface for requesting interruption of said first communication session;
    interrupting said first communication session by said processor;
    decoding a select control signal received by said transceiver from said telecommunication network after the start of said first communication session that indicates that the recipient has received a reception notification of said first communication session;
    determining, by said processor, on the basis of a time of occurrence of said first interaction and said second interaction, that a first time threshold has not been exceeded; and
    in response to decoding said select control signal received by said transceiver and determining that said first time threshold has not been exceeded, transmitting a courtesy message to said recipient in the course of a second communication session.

7. The method according to claim 6, comprising also:
    notifying the user, through the user interface, that if said second interaction for requesting the interruption of said first communication session occurs, said courtesy message will be transmitted.

8. The method according to claim 6, the method further comprising:
    detecting, by a timer, a first time datum that defines a time instant when the user has the first interaction with the user interface,
    detecting, by said timer, a second time datum that defines a time instant when the user has the second interaction with the user interface,
    evaluating, by said processor, a duration datum on the basis of said first time datum and said second time datum, wherein said duration datum represents a duration of said first communication session, and
    determining, by said processor, on the basis of said duration datum, that said first time threshold has not been exceeded.

9. The method according to claim 6, further comprising reading, by said processor, a service type datum that defines a type of a telecommunications service to which the transceiver gains access through the telecommunications network following the first interaction of the user, and determine the first time threshold on the basis of said service type datum.

10. A computer program product comprising a non-transitory memory storing computer-executable instructions, which can be loaded into a memory of an electronic computer, and which comprises portions of software code for performing the method according to claim 6.

11. A method for sending a courtesy message, comprising:
- detecting, by a processor, a first interaction of a user with a user interface for starting a first communication session towards a recipient through a transceiver communicating with a telecommunications network;
- detecting, by said processor, a second interaction of the user with the user interface for requesting interruption of said first communication session;
- interrupting said first communication session by said processor;
- determining on the basis of control signals decoded by a decoder, said decoder being configured to decode control signals received from said telecommunications network through said transceiver, that after the start of said first communication session that a select control signal, which indicates that the recipient has received a reception notification of said first communication session, has not been received from said telecommunications network; and
- based on the determination that the select control signal has not been received, inhibiting transmission of a courtesy message to said recipient in the course of a second communication session.

* * * * *